United States Patent Office 2,814,478
Patented Nov. 26, 1957

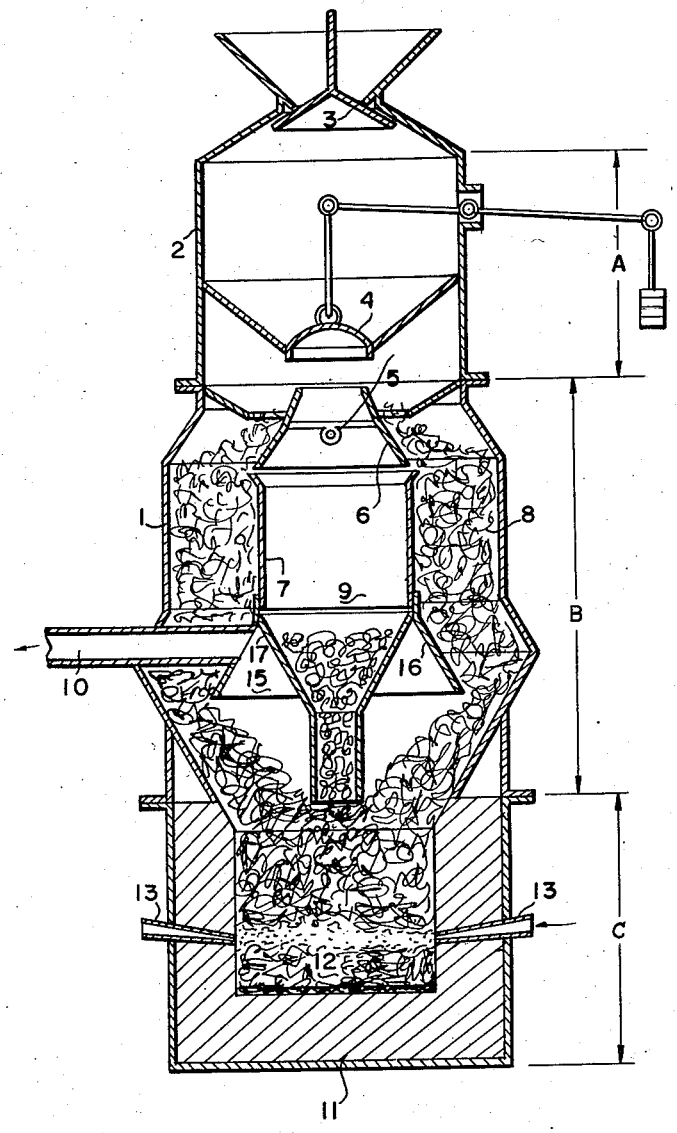

2,814,478

FURNACE SUITABLE FOR USE IN PERFORMING REDUCTION PROCESSES AT HIGH TEMPERATURES

Willem Van Loon, Geleen, Netherlands, assignor to Stamicarbon N. V., Heerlen, Netherlands Application October 26, 1954, Serial No. 464,776

Claims priority, application Netherlands October 29, 1953

2 Claims. (Cl. 266—27)

The present invention relates to a furnace suitable for use in performing reduction processes at high temperatures, such as the manufacture of carbides and ferrous alloys, and arranged so that the heat needed for carrying out the processes may be produced inside the furnace itself by the combustion of solid fuels.

High temperature reduction processes are usually carried out in shaft furnaces, the combustion being effected by supplying an oxygen-containing gas to the lower section, i. e. the hearth, of the shaft. In the upper section of the shaft where secondary reactions may take place, the solid reaction components to be supplied to the hearth can be preheated as they are fed countercurrently to the hot gases ascending through the shaft from the hearth.

Furnaces of this type have the advantage that their design and operation are simple.

However, when used for carrying out processes in which the temperature in the hearth is very high, as is the case for example in the manufacture of calcium carbide, the use of this type of furnace has the drawback that the ash components a high percentage of which is present in the ascending gases are deposited as solid matter in the cooler parts of the shaft on the solid reaction mixture which is descending through the shaft and this tends to lead to the shaft becoming clogged up so that the passage of the gases becomes obstructed.

It has also been proposed in connection with the manufacture of calcium carbide, to employ a furnace having a plurality of bunkers over the hearth from which the fuel and reaction components are arranged to be supplied into the hearth through short shafts disposed so as to obtain a substantially uniform charging of the hearth over its relatively large cross sectional area, the said shafts having gas discharge openings in their walls through which the gas may leave after passing upwardly in countercurrent to the infeeding solid materials.

In this design, the countercurrent travel of the solid material and gas in the short feed shafts does not involve sublimation of the ash components of the gas and consequent obstruction. But the provision of the plurality of bunkers entails considerable supervision.

It is the object of the present invention to provide a furnace of a design which makes it well suited for use in carrying out high temperature reduction processes such as the manufacture of calcium carbide, but which requires less supervision than the furnace as aforesaid incorporating a plurality of bunkers.

To this end, there is provided according to the present invention, a furnace which, above the hearth which is provided with tuyeres, is divided to form two bunker spaces arranged one around the other for holding solid materials feeding down into the hearth, the furnace being provided with means which may be positioned so that solid material fed into the top of the furnace is directed into one or the other of the said bunker spaces as desired and having the paths along which the solid material descends to the hearth arranged so that in use an annular space which is free of solid material is preserved at or near the lower ends of the bunker spaces, which annular space is located to trap gases rising from the hearth and cause them to discharge through a gas discharge pipe leading from the said annular space out of the furnace.

A construction of furnace in accordance with the invention is illustrated by way of example in the accompanying diagrammatic drawing showing the furnace in longitudinal section, which drawing will now be referred to:

The furnace comprises an upper section A, a middle section B, and a lower section C.

The upper section A includes a charging space 2 which is provided at the top with a cover 3. At the bottom of the space 2 is an aperture which is shown as closed by a closure member 4 which can be lowered at will in order to allow solid material in the space 2 to descend through the said opening.

The middle section B comprises an inner bunker space 9 and a surrounding bunker space 8. The space 9 is peripherally bounded by a chute 7 and the bunker space 8 is bounded by the said chute and the outer wall of the furnace. Material in the bunker space feeds continuously into the lower section C of the furnace which includes the hearth 12.

A hopper is rotatably mounted above bunker space 9, on a horizontal axis 5. If the closure member 4 is lowered to release solid material from the charging space 2 with the hopper positioned as shown in the drawing, the said material will pass into the outer bunker space 8. If however the hopper 6 is rotated through 180° to bring its wider end to the top and the closure member 4 is then lowered, the material released from the charging space 2 passes into the hopper and through into the inner bunker space 9.

The lower section C of the furnace comprises a firebrick lined shaft enclosing the hearth 12 of the furnace into which lead the tuyeres 13 of the furnace. The bottom 11 of the furnace is also lined with refractory material and the said bottom and the adjoining peripheral wall of the section C of the furnace from a reservoir for collecting the liquid material forming when the furnace is in operation, with material (e. g., $CaC_2$, ferrosilicon) can be discharged through one or more discharge openings (not shown).

Towards the bottom, the chute 7 is tapered and an annular wall 16 is provided so as with the wall 17 of the tapered portion of the chute to define a downwardly opening annular space 15. By the wall 16 the solid material descending through the bunker space 8 is so directed that the space 15 is preserved free of solid material. The space 15 is located so that it traps gas rising from the hearth 12 and a gas discharge pipe 10 leads out through the wall of the furnace from the space 15 for conveying away the gas passing into the said space.

Unlike the lower section C of the furnace, which is provided with a firebrick lining, the remaining part of the furnace is unlined; the sections A and B may be formed from sheet iron.

By way of example, the following is the operation in the manufacture of calcium carbide; alternate charges of coke and limestone are dumped into the charging space 2. After dumping a charge of coke, the closure member 4 is lowered with the hopper 6 positioned as shown in the drawing so that the coke descends into the outer bunker space 8. After dumping a charge of limestone or a limestone-coke mixture in the charging space 2 the closure member 4 is lowered with the hopper 6 positioned with its wider end to the top so that the charge passes into the hopper through the annular space between the periphery of the closure member 4 and the periphery of the mouth of the hopper, and thus into the bunker space 9.

A continuous supply of limestone surrounded by coke descends into the hearth of the furnace.

Streams of oxygen, oxygen-enriched air or oxygen-steam mixture are injected into the hearth through the tuyeres 13, as a result of which part of the coke is burnt and the temperature in the hearth becomes so high that carbide is formed. The gases formed during the combustion of the coke and in the course of the carbide formation rise into the annular space 15 over the hearth and are carried off through the gas discharge pipe 10. The molten carbide collects in the lower section of the furnace and is tapped out through holes (not shown) provided in the bottom or side wall of the said lower section.

I claim:

1. A furnace of the type described comprising wall means defining a lower hearth having tuyeres therein and a bunker space thereabove arranged to receive solid material from its upper end, means within said bunker space for dividing the same into two bunker spaces, means for directing the solid material fed into said upper end into either of said bunker spaces, means adjacent the lower end of said bunker space dividing means for preventing the material passing through said bunker spaces to the hearth from entering an annular space adjacent the lower end of the bunker spaces, and a gas discharge pipe leading from said annular space out of the furnace for discharging gases rising from the hearth trapped in said annular space.

2. A furnace of the type described comprising wall means defining a lower hearth having tuyeres therein and a bunker space thereabove arranged to receive solid material from its upper end, a chute mounted in the central portion of said bunker space and dividing the same into inner and outer concentric bunker spaces, said chute having a pair of downwardly diverging walls at its lower end, said walls being open at their lower ends and defining an annular space adjacent the lower ends of the bunker spaces, means for directing the solid material fed into said upper end into either the inner or outer bunker space, said walls serving to prevent the solid material descending through said bunker spaces to said hearth from entering said annular space, and a gas discharge pipe leading from said annular space out of the furnace for discharging gases rising from said hearth trapped in said annular space.

References Cited in the file of this patent

UNITED STATES PATENTS

| | | |
|---|---|---|
| 906,717 | Johnson | Dec. 15, 1908 |
| 1,401,222 | Wiberg | Dec. 27, 1921 |
| 2,619,344 | Mursch | Nov. 25, 1952 |

FOREIGN PATENTS

| | | |
|---|---|---|
| 538,016 | Germany | Oct. 25, 1930 |
| 713,137 | Germany | Nov. 1, 1941 |
| 586,819 | Great Britain | Apr. 1, 1947 |
| 1,073,154 | France | Mar. 17, 1954 |